US011843820B2

(12) United States Patent
Smith et al.

(10) Patent No.: US 11,843,820 B2
(45) Date of Patent: Dec. 12, 2023

(54) GROUP PARTY VIEW AND POST VIEWING DIGITAL CONTENT CREATION

(71) Applicant: Sony Interactive Entertainment LLC, San Mateo, CA (US)

(72) Inventors: Kimberlee Smith, San Mateo, CA (US); Jennifer Sheldon, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/145,183

(22) Filed: Jan. 8, 2021

(65) Prior Publication Data

US 2022/0224966 A1     Jul. 14, 2022

(51) Int. Cl.
*H04N 21/431*     (2011.01)
*H04N 21/485*     (2011.01)

(52) U.S. Cl.
CPC ....... *H04N 21/431* (2013.01); *H04N 21/4858* (2013.01)

(58) Field of Classification Search
USPC .......................................................... 725/37
See application file for complete search history.

(56) References Cited

U.S. PATENT DOCUMENTS

| | | | |
|---|---|---|---|
| 11,451,885 B1* | 9/2022 | Chandrashekar | H04N 21/4788 |
| 2008/0154908 A1 | 6/2008 | Datar et al. | |
| 2010/0169906 A1* | 7/2010 | Takahashi | H04N 21/4307 |
| | | | 725/13 |
| 2010/0238303 A1* | 9/2010 | Newell | H04N 21/4334 |
| | | | 725/136 |
| 2010/0325527 A1 | 12/2010 | Estrada et al. | |
| 2012/0324491 A1* | 12/2012 | Bathiche | H04N 21/42201 |
| | | | 725/10 |
| 2013/0346867 A1* | 12/2013 | Woods | G11B 27/34 |
| | | | 715/728 |
| 2014/0007147 A1* | 1/2014 | Anderson | H04N 21/6582 |
| | | | 725/9 |
| 2014/0007149 A1* | 1/2014 | Huang | G06Q 30/0255 |
| | | | 725/12 |
| 2014/0137144 A1* | 5/2014 | Jarvenpaa | H04N 21/6582 |
| | | | 725/9 |
| 2015/0271548 A1* | 9/2015 | Daub | H04H 60/33 |
| | | | 725/12 |
| 2017/0199872 A1* | 7/2017 | Krasadakis | G06F 16/2456 |

(Continued)

OTHER PUBLICATIONS

U.S. Appl. No. 17/145,187, Oludemilade Raji, System and Methods to Capture Viewer Annotations for Entertainment and Post Viewing Discussion.

(Continued)

*Primary Examiner* — Nathan J Flynn
*Assistant Examiner* — Caroline Somera
(74) *Attorney, Agent, or Firm* — Polsinelli LLP

(57) ABSTRACT

The present disclosure relates to systems and methods for group-watching video streams. In one aspect the disclosed systems and methods may generate a multi-panel display of the viewers during viewing of the video streams. In another aspect, the systems and methods may capture and create one or more digital asset from viewer-generated content, such as a physical reaction, captured during the to the video stream. The system may generate the digital assets for subsequent use on social media.

20 Claims, 8 Drawing Sheets

(56) References Cited

U.S. PATENT DOCUMENTS

| | | | |
|---|---|---|---|
| 2017/0214972 A1* | 7/2017 | Norhammar | H04L 65/1104 |
| 2017/0230466 A1* | 8/2017 | Carlos | H04L 67/1095 |
| 2018/0124477 A1* | 5/2018 | Qu | H04N 21/8545 |
| 2019/0104325 A1* | 4/2019 | Linares | H04N 21/236 |
| 2021/0185276 A1* | 6/2021 | Peters | G06V 20/41 |

OTHER PUBLICATIONS

U.S. Appl. No. 17/145,187 Office Action dated May 27, 2021.

\* cited by examiner

500

"Viewer 1" 504A

"Viewer 2" 504B

"Viewer 3" 504C

The first time you watch The Shining
10.31.2020   506

GROUP PARTY VIEW AND POST VIEWING DIGITAL CONTENT CREATION

BACKGROUND

1. Field of Disclosure

The present disclosure generally relates to systems and method for the creation of digital assets during group viewing of media. In particular, the disclosed systems and methods allow viewers to create digital assets of their individual or collective reactions during the viewing of media.

2. Description of the Related Art

Systems exist to facilitate coordinated group-watching or viewing of online streaming media. While these systems may be used in conjunction with third-party chat platforms, they existing systems often fail to provide lasting mementos from the group viewing party. There is, therefore, a need to provide more and lasting engagement experience in a digital environment associated following the group-watching of online or streaming media.

SUMMARY OF THE CLAIMED DISCLOSURE

The present disclosure relates to systems and methods for group-watching video streams. In one aspect the disclosed systems and methods may generate a multi-panel display of the viewers during viewing of the video streams. In another aspect, the systems and methods may capture and create one or more digital asset from viewer-generated content, such as a physical reaction, captured during the to the video stream. The system may generate the digital assets for subsequent use on social media.

DETAILED DESCRIPTION

The present disclosure describes methods and systems for individual or group-watching video streams. In particular, a multi-panel display of the viewers may be superimposed over the video stream. In various aspects, the multi-panel overlay may be minimized or positioned not to obstruct the video stream.

In various aspects, viewer-generated content, including reactions whether physical, audible, or otherwise input at the viewers computing device, may be captured automatically and tracked in real time. Alternatively, viewer-generated content may be timestamped and used to composite the multi-panel overlay from individual viewer streams during or after viewing the streamed media.

After viewing the streamed media, the viewer-generated content may be used to form the overlay. Conversely, the overlay itself may be used to create digital content or digital assets at desired time points of the video stream. In one aspect, the creation of the digital assets may be dictated by a real-time or compiled voting system amongst the viewers. Additionally, the disclosed system and methods may refer to viewer privacy settings and default actions that may be taken in response to the results of the voting system.

Figure 1:
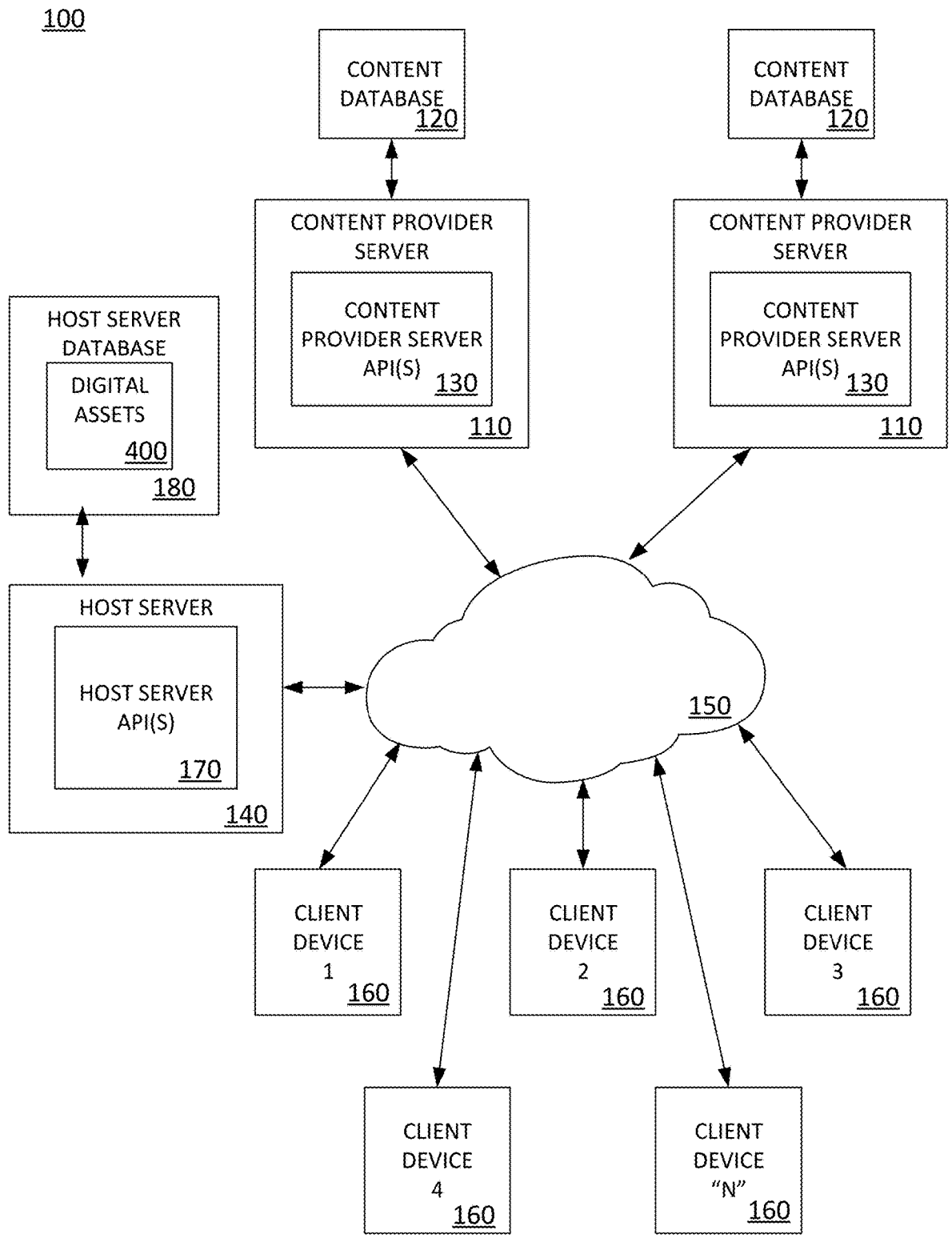
FIG. 1 illustrates an exemplary network environment in which a system for the group viewing of streaming media and the creation of digital assets may be implemented.

FIG. 1 illustrates a network environment 100 in which a system for group viewing of a media stream and creating digital assets therefrom may be implemented. The network environment 100 may include one or more content provider servers 110 that provide streaming content (e.g., video), stored in one or more data base 130, for distribution (e.g., via video on-demand (VOD) services) using one or more content provider server application program interfaces (APIs) 130. The network environment 100 may also include a content delivery host server 140, a public network 150, and one or more client devices 160.

Content provider servers 110 may maintain and provide media content available for streaming. Such media content may include not only pre-recorded content (e.g., DVR content), but also streams of live broadcasts (e.g., live sporting events, live e-sporting events, broadcast premieres). The content provider servers 110 may be associated with any content provider, such as but not limited to Netflix®, Hulu®, or Amazon Prime, among others that make its content available to be streamed. In various aspects, streaming as used herein may also include the viewing or consumption of media that is downloaded to one or more client devices.

The streaming content from content provider server 110 may be provided through a content provider server API 130, which allows various types of content sources server 110 to communicate over the public network 150. The content provider server API 130 may be specific to the particular language, operating system, protocols, etc. of the content provider server 110 providing the streaming content. In a network environment 100 that includes multiple different types of content provider servers 110, there may likewise be a corresponding number of content provider server APIs 130.

The content provider server API 130 therefore facilitates direct or indirect access for each of the client devices 160 to the content hosted by the content provider servers 110. Additional information, such as metadata, about the accessed content can also be provided by the content provider server API 130 to the client device 160. As described below, the additional information (i.e. metadata) can be usable to provide details about the content being streamed to the client device 160. Finally, additional services associated with the accessed content such as chat services, ratings and profiles can be provided from the content provider servers 110 to the client device 160 via the content provider server API 130.

The content provider server API 130 can be accessed by a content delivery host server 140. The content delivery host server 140 may include a server that provides resources and files related to the media stream, including promotional images and service configurations with client devices 160.

The content delivery host server 140 can also be called upon by the client devices 160 that request to stream or subscribe to specific content.

The content provider server API 130 may be accessed by a host server API 170 in order to obtain information about available streaming content for the client device 160. As described below, the additional information about the content may include metadata describing the available content (e.g., by author, title, genre). The information may also include a location where the content is stored (e.g., URL) so that the viewer device can proceed with retrieving the content from the content provider server 110. Furthermore, the host server API 170 may include instructions or graphic viewer interfaces for implementing functionalities (e.g., chat) that would allow different client devices 160 to interact with each other. Such instructions may be used by the host server API 170 to provide certain functionalities to the client device 160.

The host server API 170 may be responsible for communicating with the different content provider servers 110 in order to provide that content to the client device 160. The host server API 170 may carry out instructions, for example, for identifying the format of the media content and formatting the media content to be playable on the client device 160. Such formatting may include identifying the metadata associated with each of the content then using various different types of conversion techniques so that data stored in one format at the content provider servers 110 may be rendered and displayed on the client devices 160, which may require a different format. As such, media content of different formats may be provided to and made compatible with client device 160 via the host server API 170.

The public network 150 facilitates communication of the steaming media from content provider server 110 and the host server 140 with the plurality of client devices 160. The public network 150 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between viewer devices connected through a network service provider. Examples of network service providers include the public switched telephone network, a cable service provider, a provider of digital subscriber line (DSL) services, or a satellite service provider.

The client device 160 may include a plurality of different types of computing devices. For example, the client device 160 may include any number of different gaming consoles, mobile devices, laptops, and desktops. Such client devices 160 may also be configured to access data from other storage media, such as, but not limited to memory cards or disk drives as may be appropriate in the case of downloaded services. Such devices 160 may include standard hardware computing components such as, but not limited to network and media interfaces, non-transitory computer-readable storage (memory), and processors for executing instructions that may be stored in memory. These client devices 160 may also run using a variety of different operating systems (e.g., iOS, Android), applications or computing languages (e.g., C++, JavaScript). An exemplary client device 160 is described in detail herein with respect to FIG. 3.

The host server 140 further stores and retrieves data from a host database 180. The host database 180 also stores any digital assets or other content created during or after one or more viewers consumes streaming media at the client device 160. The database 180 also stores the metadata associated with the media stream being provided to the client devices 160. The host server 140 can generate metadata to relevant to the viewers' interactions with the hot server 140. In one example, the metadata can be used to link viewer-generated content at the viewer computing devices 160 for the creation of digital assets 500.

Figure 2:
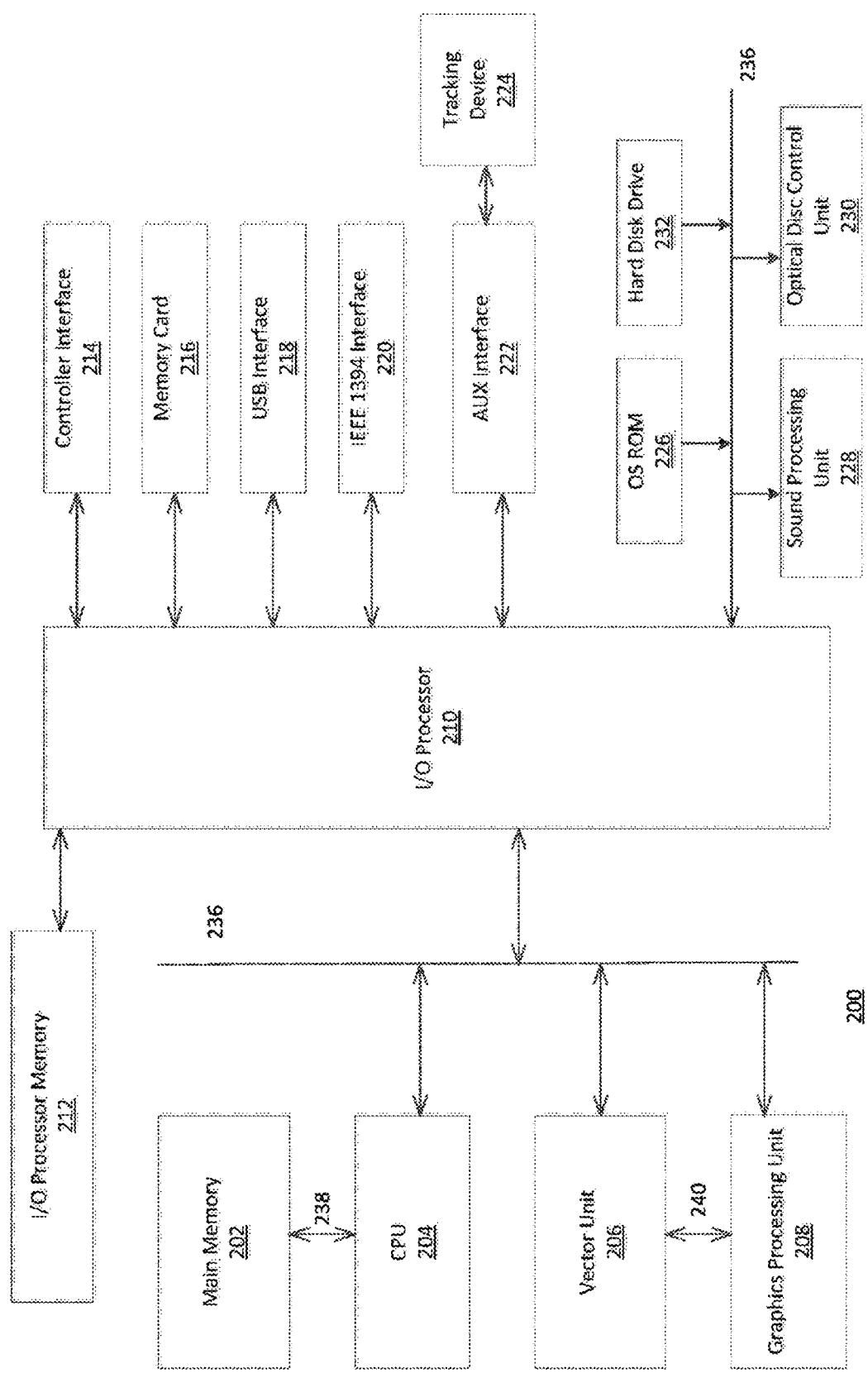
FIG. 2 is an exemplary viewer device that may be used in context of the system of FIG. 1.

FIG. 2 is an exemplary viewer device 200 that may be used in context of the system of FIG. 1. The client device 200 may correspond to client device 160 of FIG. 1 and may be inclusive of desktop, laptop, tablet, mobile device, console gaming system, etc. The client device 200 is a device that the viewer can utilize to facilitate carrying out features of the present disclosure pertaining to the group-watching of streaming media and the creation of digital assets. In particular, the client device 200 allows the viewer to view the streamed media at any location and time remotely.

The client device 200 may include various elements as illustrated in FIG. 2. It should be noted that the elements are exemplary and that other aspects may incorporate more or less than the elements illustrated. With reference to FIG. 2, the client device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE interface 220, an auxiliary (AUX) interface 222 for connecting a tracking device 224, although other bus standards and interfaces may be utilized. The client device 200 further includes an operating system read-only memory (OS ROM) 226, a sound processing unit 228, an optical disc control unit 230, and a hard disc drive 232, which are connected via a bus 234 to the I/O processor 210. The client device 200 further includes at least one tracking device 224.

The tracking device 224 may be a camera, which includes eye-tracking capabilities. The camera may be integrated into or attached as a peripheral device to client device 200. According to various aspects, typical eye-tracking devices may use infrared non-collimated light reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer may be needed before using the eye tracker.

In other aspects, trackers that are more sensitive may use reflections from the front of the cornea and that back of the lens of the eye as features to track over time. In yet other aspects, even more sensitive trackers image features from inside the eye, including retinal blood vessels, and follow these features as the eye rotates. Most eye tracking devices may use a sampling rate of at least 30 Hz, although 50/60 Hz is most common. Some tracking devises may run as high as 240 Hz, which is needed to capture detail of very rapid eye movement. The foregoing describes example eye-tracking technology that may be used in accordance with the present disclosure. In various aspects, any known eye gaze tracking technology that one skilled in the art would be capable of applying could be used.

A range camera may instead be used with the present disclosure to capture gestures made by the viewer and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This viewer device may also employ a variant of image-based three-dimensional reconstruction.

The tracking device 224 may include a microphone integrated into or attached as a peripheral device to client device 200 that captures voice data. The microphone may conduct acoustic source localization and/or ambient noise suppression. The microphones may be usable to receive verbal instructions from the viewer to schedule, retrieve, and display content on the client device 200.

Alternatively, tracking device 224 may be the controller of the viewer device 200. The controller may use a combination of built-in accelerometers and infrared detection to sense its position in 3D space when pointed at the LEDs in a sensor nearby, attached to, or integrated into the console of the entertainment system. This design allows viewers to control functionalities of the client device 200 with physical gestures as well as button-presses. The controller connects to the client device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement. Further still, in various aspects, any technology suitable for measuring and/or capturing motion, facial expressions and/or any other physical or physiological state of a viewer may be used.

As noted above, the client device 200 may be an electronic gaming console. Alternatively, the client device 200 may be implemented as a general-purpose computer, a set-top box, or a hand-held gaming device. Further, similar viewer devices may contain more or less operating components.

The CPU 204, the vector unit 206, the graphics-processing unit 208, and the I/O processor 210 communicate via a system bus 236. Further, the CPU 204 communicates with the main memory 202 via a dedicated bus 238, while the vector unit 206 and the graphics-processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 230. The I/O processor 210 primarily controls data exchanges between the various devices of the viewer device 200 including the CPU 204, the vector unit 206, the graphics processing unit 208, and the controller interface 214.

The graphics-processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics-processing unit 208. Furthermore, the sound processing unit 230 executes instructions to produce sound signals that are outputted to an audio device such as speakers (not shown).

A viewer of the client device 200 provides instructions via the controller interface 214 to the CPU 204. For example, the viewer may instruct the CPU 204 to store certain information on the memory card 216 or instruct the viewer device 200 to perform some specified action. Example controllers associated with the controller interface 214 may include a touch-screen, keyboards, and game controllers.

Other devices may be connected to the client device 200 via the USB interface 218, the IEEE interface 220, and the AUX interface 222. Specifically, a tracking device 224, including a camera or a sensor may be connected to the client device 200 via the AUX interface 222, while a controller may be connected via the USB interface 218. In some aspects, a VR headset or related hardware equipment may be communicatively coupled to computing device 200 via one or more computing interfaces. Hardware and related software for implementing an augmented reality (AR) experience may similarly be coupled to computing device 200 via one or more computing interfaces.

Figure 3:
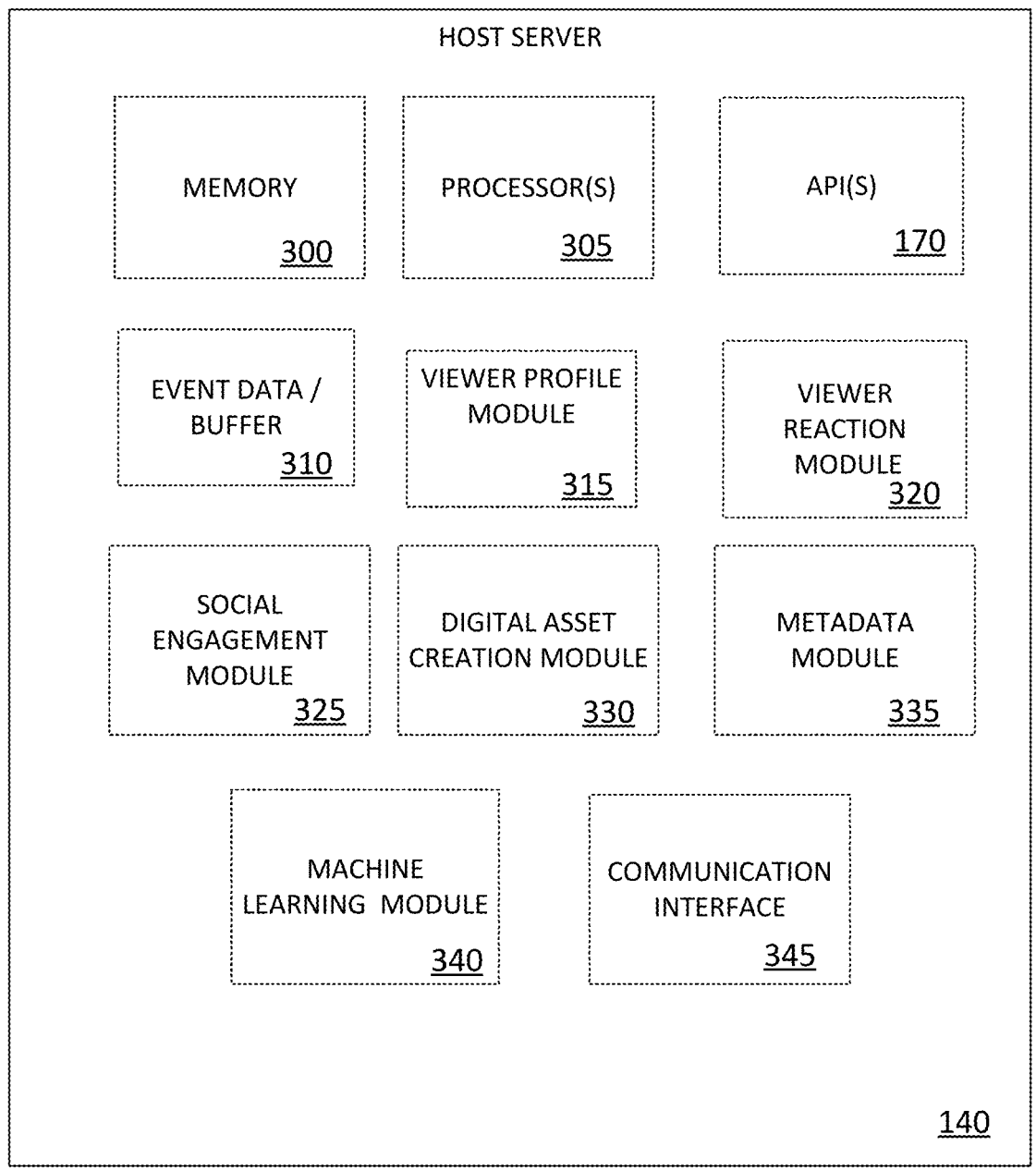
FIG. 3 is a block diagram of an exemplary host server that may be used in context of the system of FIG. 1.

FIG. 3 is a block diagram of an exemplary host server 140 that may be used in context of the system of FIG. 1. The host server 140 may include a plurality of different features that facilitates group-viewing and the creation of digital assets. As illustrated in FIG. 3, the host server 140 may include memory 300, one or more processor 305, the host server application program interface (API) 140, a streaming media storage and buffer 310, a viewer profile module 315, a viewer reaction module 320, a social engagement module 325, a digital asset creation module 330, a metadata module 335, a machine learning module 340, and a communication interfaces 345.

According to one aspect, the host application program interface (API) 140 allows a host to manage how data, including but not limited to the media stream, is distributed to remote viewers. Using the API 140, an administrator (e.g., developer, gaming platform provider, streaming media aggregator) can customize and modify how the host server operates with respect to what data is retrieved from the content provider server 110, how the media stream is presented to the client devices, and how digital assets are generated and compiled during viewing of the media stream.

The media storage and buffer 310 may be used to store the streaming media temporarily until it can be processed and distributed to viewers. In another aspect, the media storage and buffer may be used to store the viewer-generated content anddigital assets temporarily.

The viewer profile module 315 is used to store information about each viewer. In one aspect, viewers may need to create their own profile and sign in to their respective profiles before being allowed to access/view the media content ("streamed media"). The stored viewer profiles would be used by the host server 140 to identify the types of modifications to the media stream or digital assets that can be carried out to better engage the viewer in the viewing experience.

The viewer profile module 315 may also store viewer preferences about the distribution of the media viewed on their respective client devices 160. For example, the viewer profile module 315 can customize preferred views, preferred additional information to be displayed, preferred audio, and even preferred advertisements. The viewer profile module 315 also stores privacy settings and preferences for the viewers. For example, the privacy settings may dictate when or how a viewer's likeness or other identifying information is incorporated into any group-viewing generated digital assets. In one aspect, a viewer may indicate that they prefer not to be included in any digital assets. Alternatively, a viewer may indicate that they do not wish to be included in digital assets that may be formatted for subsequent sharing.

The viewer profile module 315 can also store information about the client devices. This information may identify, for example, the format the media stream would need to be transmitted in order to be compatible with the client device. With all the information about the viewer stored in the viewer profile, the host server 140 would be able to identify the appropriate version of the media stream to be distributed.

The viewer reaction module 320 receives and processes viewer-generated content related to a viewer's reaction to the presented streaming media. The reactions may also include physical movements or facial expressions captured by the tracking device 224.

During group-viewing of the media stream, the viewer reaction module 320 captures data from the viewer's respective client devices 160. The viewer reaction module 320, alone or in conjunction with the metadata module 335, may synchronize multiple viewer reactions of multiple viewers captured from their respective client devices and the viewed streaming media, such that viewer reactions in response to the same actions or events in the media stream may be correlated to one another. In another aspect, the viewer reaction module 320 may identify a type of reaction made by the viewer and classify the same as a laughing, crying, frightened, or ambivalent, among others. In addition, to physical reactions of the viewer captured by the tracking device 224, the viewer reaction module 320 may also receive and incorporate text or graphics input by the viewer.

The social engagement module 325 facilitates and encourages further engagement with the media stream and social interactions among the viewers at the client devices 160. In various aspects, the social engagement module 325 may facilitate social interactions between the groups of viewers. For example, the social engagement module 325 may generate a video chat among viewers of the media stream. In one aspect, the members of the video chat may be limited to viewers invited to the video chat. According to one aspect, the digital assets, based on viewer-generated content, may include images or video of the viewers captured during the video chat. In another aspect, the social engagement module 325 may facilitate communication between viewers using chat, email, video chat, or any other suitable communication modalities.

Figure 4:
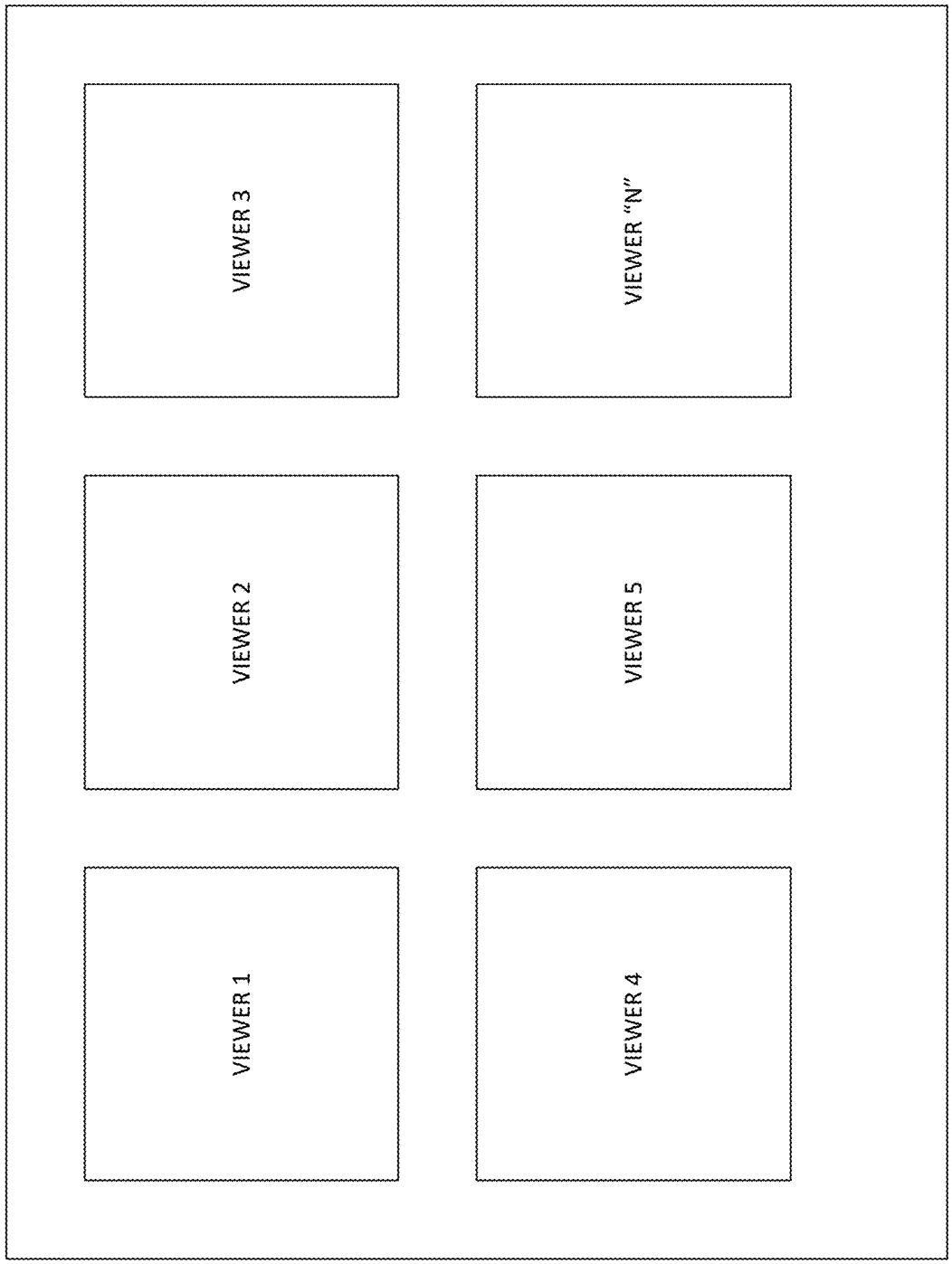
FIG. 4 is an exemplary group-viewing overlay created during the use of the system of FIG. 1.

In one aspect, the social engagement module 325 may generate a multi panel overlay 400, as shown in FIG. 4, over the streaming media that incorporates real-time streams from the client devices 160 capturing the viewers as the watch the streaming media. The multi panel overlay 400 may be the display of a multi-person video chat among the viewers or the multi panel overlay may be a non-interactive composite of individual video streams recorded in real-time at the various client devices 160. In various other aspects, the overlay 400 may be formatted for display over the streamed media without obstructing the streamed media. In another aspect, the overlay 400 may be displayed alongside the streamed media; while in other aspects, the overlay 400 is not displayed to viewer's during the group-viewing yet may be presented during a pause in the streamed media or after the conclusion of the streamed media.

The digital asset creation module 330 creates digital assets from the images, video, or other inputs received from the viewers' client devices 160. The inputs may include physical motions or facial expressions as identified by the tracking device 224. In one aspect, the digital assets are composed of images of the viewer during certain portions of the media stream. For example, the digital asset 500 may be an image of an individual viewer or a composite image of multiple viewers depicting their reactions to the same portion of the media stream. In another aspect, the digital asset 500 may be a video of one or more viewers reacting to the media stream. In various aspects, the digital asset creation module 330 generates one or more digital asset 500 during viewing of the media stream. Alternatively, the digital asset creation module 330 may generate one or more digital asset 500 at the conclusion of the media stream.

Figure 5A:
FIG. 5A is an exemplary digital asset created during the use of the system of FIG. 1.
Figure 5A:
Figure 5A:
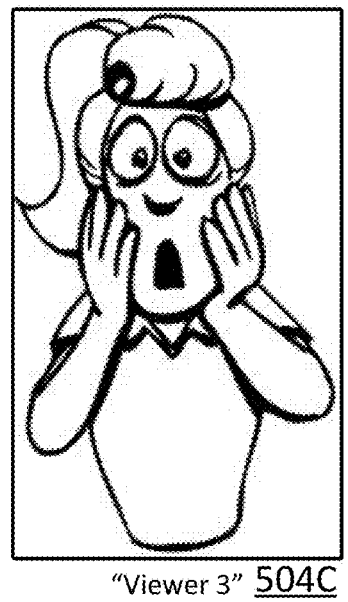

The digital asset creation module 330 may further format or otherwise manipulate the viewer-generated content and digital asset for distribution over the public network to other platforms including but not limited to other social network platforms. In one aspect, after generation of the digital asset 500, viewers may add additional text, audio, or other features to create a meme from the generated digital asset. For example, as shown in FIG. 5A, a digital asset 500 created during a group viewing of a horror movie, (e.g. The Shining) may depict the viewers 504 A-C all reacting to and being frightened by the same scene in the movie. In one aspect, the frightened reactions may be captured in real time. Alternatively, the viewer reactions may be captured whenever the viewer watches the movie, even if not viewed simultaneously with other viewers. By using timestamps, the digital asset creation module 330 may synchronize the captured viewer reactions to produce the digital asset. As shown in FIG. 5A, additional indicia 506, such as text or graphics regarding the group viewing event may be included. The additional indicia 506 may be generated automatically based on the media streamed or the indicia may be input and edited by one or more viewer 504A-C.

The digital asset creation module 330 may also censor or prevent the generation of a digital asset 500 based upon input from one or more viewers. For example, the digital asset creation module 330 may poll each of the viewers after the creation and display of a digital asset 500 to seek approval to publish the asset. The rejection of a digital asset 500 may involve only a single viewer whose captured image is removed from the digital asset or it may reject the entire image if a number of viewers above a pre-determined threshold reject the asset.

Figure 5B:
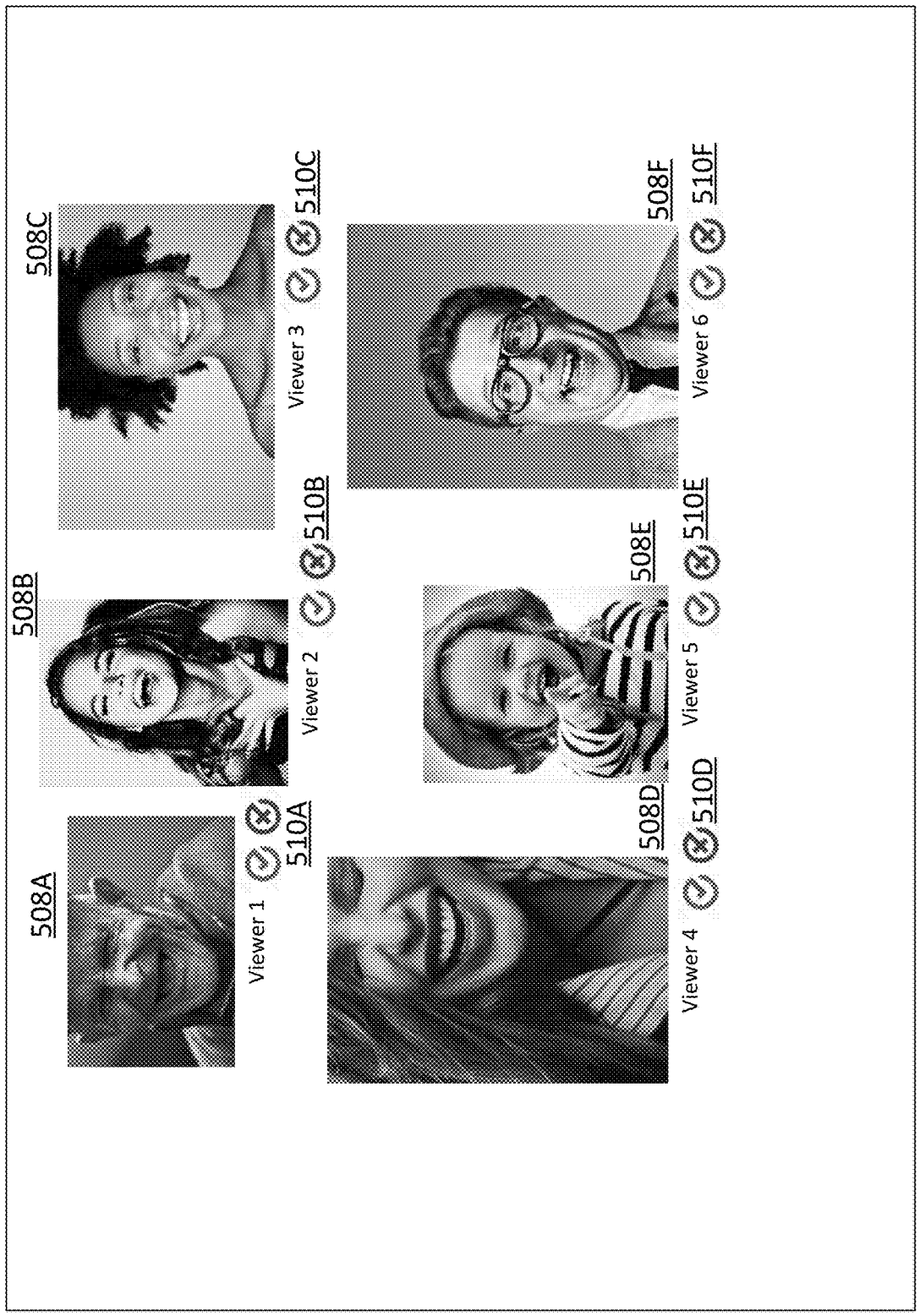
FIG. 5B is an exemplary evaluation digital asset created during the use of the system of FIG. 1.
Figure 5C:
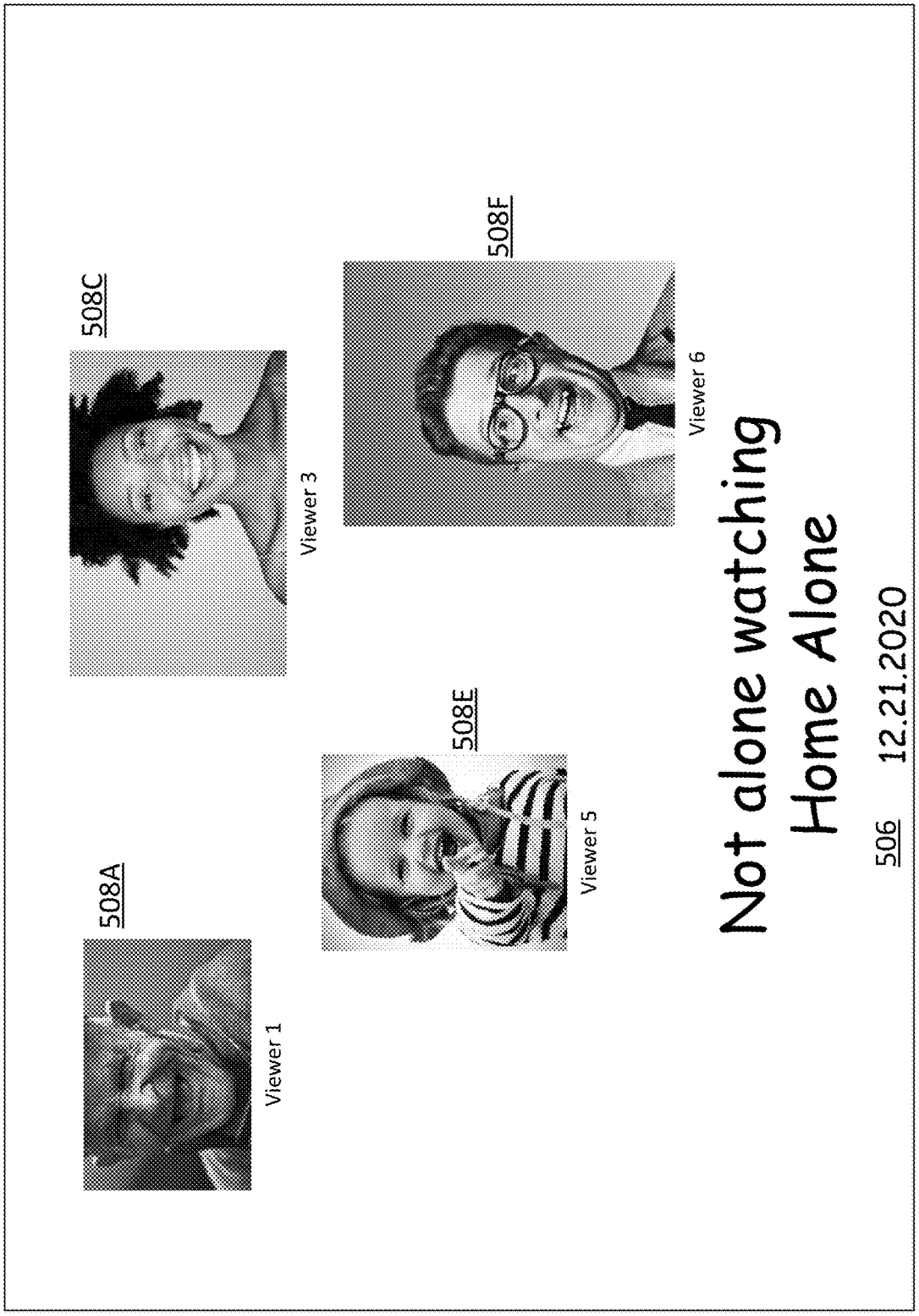
FIG. 5C is an exemplary digital asset created during the use of the system of FIG. 1, after polling the viewers.

For example, referring now to FIGS. 5B and 5C, the digital asset creation module 330 may generate a preliminary digital asset 502A. As shown, this preliminary digital asset 502A includes reaction images 508A-F from multiple viewers. The initial digital asset 502A also includes polling data 510A-F to receive input regarding the acceptance or rejection of the reaction image 508A-F for each viewer. After polling the viewers, a final digital asset 502B is generated. The final digital asset 502B, as shown in FIG. 5C, two of the reaction images are omitted as they were rejected during the polling process.

In yet another aspect, the digital asset creation module 330 works in conjunction with the machine learning module 340 to predict the likelihood that a viewer will reject an image or video proposed for inclusion in a digital asset 500. For example, the machine learning module may help identify a captured image where a viewer has their eyes closed or the image is blurry such that the viewer is likely to vote for rejecting the captured image. Similarly, the digital asset creation module 330 may reference stored viewer profile data to identify any privacy restrictions desired by the viewers. For example, a viewer may require approval for all digital assets before publication and viewing by the other viewers. In another example, a viewer may indicate a preference in their viewer profile for the automatic approval of all captured images. Alternatively, a viewer may automatically opt of the capture of any images or video.

The metadata module 335 generates metadata for the media stream and the viewer-generated assets created during the group viewing. Additionally, the generated metadata may be used to synchronize viewer-generated content with the media stream further. The metadata may also be used to recall previous instances of viewer-generated assets, and portions thereof. In another aspect, the metadata module 335 may identify or assign timestamps related to the streaming media and/or in response to the viewer-generated content and inputs.

In another aspect, the metadata may be associated with a particular viewer or a group of viewers; while in another aspect, the metadata may be associated with a particular type of reaction in the viewer-generated digital assets. This can be performed, for example, by providing unique labels for the media stream, viewers, and/or the generated digital assets. In this way, the digital assets may be stored separately from the metadata that is generated. However if the digital assets are ever retrieved and viewed by the viewer, the corresponding metadata can be queried and applied accordingly.

The machine learning module 360 may be an internal or external artificial intelligence (AI) or other machine learning system trained using any suitable machine learning model, system, or dataset to predict or identify likely viewer preferences and likely actions while viewing the media stream, among others. The machine learning module 360 may also be used to predict viewer reactions and may adjust the tracking device 224 automatically. For example, the machine learning module 360 may determine when a frightening or scary portion of the media stream will displayed and may determine that a full-body reaction by the viewer may occur. Based on this determination, the machine learning module 360 may instruct a tracking device 224 of the viewer's client device 160 to zoom-out to capture a predicted whole body reaction, such as jumping. Alternatively, the machine learning module 335 may provide instructions to the tracking device 224 to zoom-in on a viewer's face. The machine learning module 335 may determine the best tracking device 224 settings to capture a likely reaction based upon previous viewer actions, previous digital asset approvals or rejections, historic viewer reactions from all viewers of the media stream or combinations thereof.

The communication interface 345 facilitates communication between the various features of the system of FIG. 1. For example, this would facilitate transmission of information from the content provider server 110 to the host server 140 and from the host server to the client devices 160.

Figure 6:
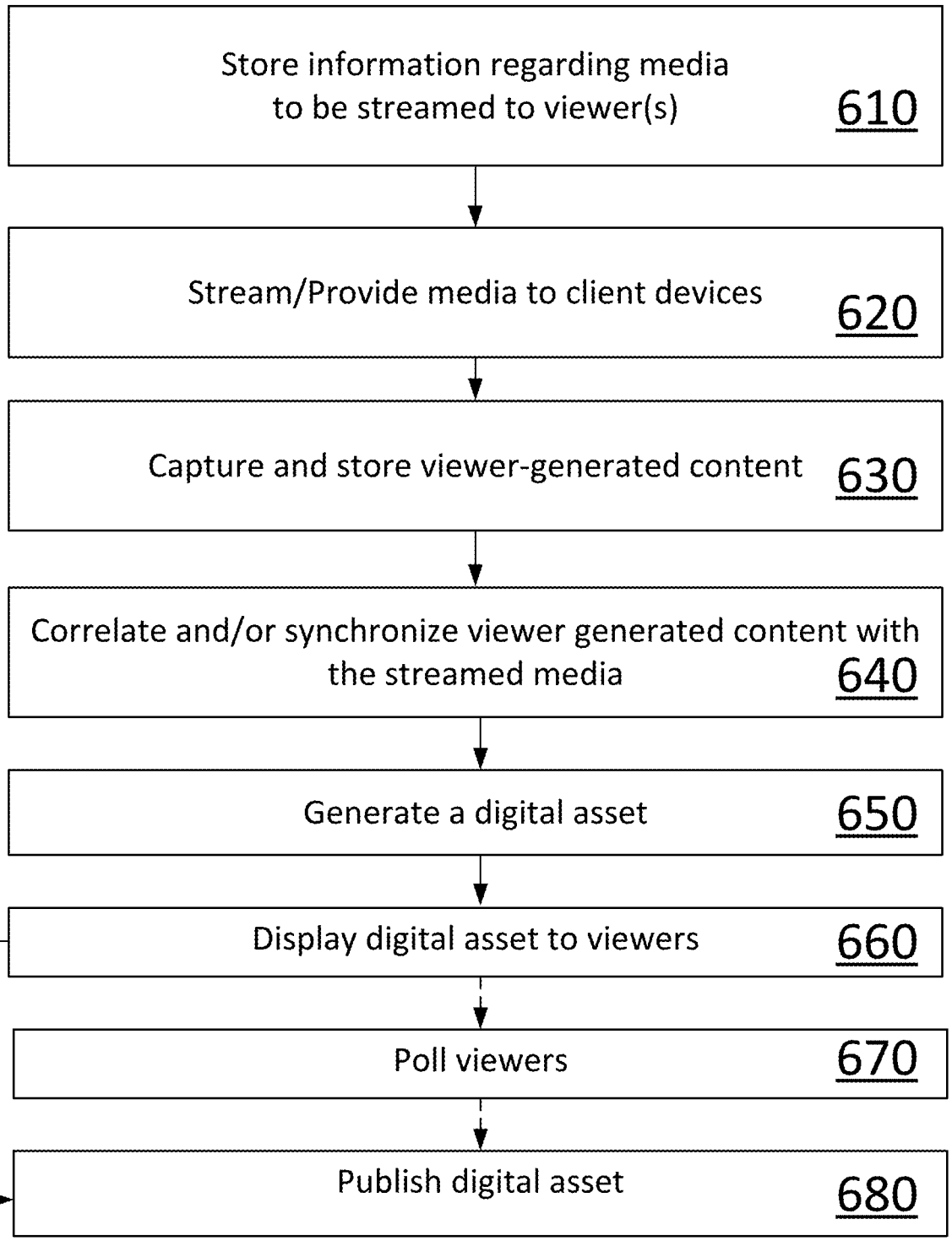
FIG. 6 is a flowchart illustrating a method of generating a digital asset using the system of FIG. 1.

FIG. 6 is a flowchart illustrating an exemplary method 600 for generating digital assets during group-watching of a media stream or streaming media. The method 600 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to perform or aid in performing the method. The steps identified in FIG. 6 (and the order thereof) are exemplary and may include various alternatives, equivalents, or derivations thereof including but not limited to the order of execution of the same.

In method 600, information may be stored in memory regarding the media content that may be streamed to the client devices 160. Content, such as but not limited to viewer reactions, may be captured during play of the streamed media content. The captured reactions may be composited into a digital asset 500 that may be subsequently shared on various social media platforms. Additionally, one or more timestamps may be associated with the captured content, such that the media content and the captured content may be synchronized for later streaming and display. In this aspect, the streaming media and generated digital asset 500 may be viewed again by the viewers. Alternatively, an acquaintance of the group viewing the streaming media may view the streaming media at a later time and view the previously generated digital asset or they may capture their own reaction to generate new digital assets.

In step 610, information may be stored in memory regarding a content provider and a media stream. A host may establish a channel or interface for distributing the media stream from the content provider. The host may require authentication information from viewers (e.g., viewer name, password) that allows an account to be established in association with the content distribution interface. In addition, various other devices in the network may subscribe to receive content distributed through the interface. Information regarding the host, the content provider, data regarding the streamed media, and the viewers of the group-viewing event may be maintained in memory. Where certain content providers require a specific subscription (e.g., "premium" cable content), the subscriber device may be required to have a subscription associated with the content provider in order to access content through the channel.

In step 620, media content (e.g., a specified episode of a television program) may be streamed to the client devices 160. As discussed herein, the media content may include any type of pre-recorded or live media content available to be streamed over a communication network. Such media content may originate from a content provider server 110, formatted by content provider server API 130 and they are then provided to the client devices through an interface generate by the host server API 170. In another aspect, the streaming media may be provided to the client device directly from the content provider server or another source, while the host server API 170 communicates with the content provider server or other source at the backend to gather data regarding the streaming media and synchronize the viewer-generated content.

In step 630, content generated by the viewers may be captured during display of the streaming media. In various aspect, the viewer-generated content may include audio or video commentary, viewer reactions, background or other contextual asides, text, graphics and other types of content generated in reaction to the streaming media. Because the viewer-generated content may be produced and captured during play of the streaming media, the timing of the viewer-generated content may be correlated to with the timing of the displayed media. For example, the viewer-generated content may start at a certain point within the timeline of the streaming media.

In step 640, metadata, including one or more timestamps related to the media content may be assigned to the viewer-generated content. Because the viewer-generated content may be responsive to what is being shown as during play of the media content, such viewer-generated content may not make sense or otherwise lack context when played in the absence of the media content or when played out of sync with the media content. As the viewer-generated content is captured, however, one or more timestamps (e.g., reflecting a current point within the timeline of the playing media content) may be associated with certain points within the viewer-generated content.

In step 650, one or more digital assets may be created from the viewer-generated content. In one aspect, the digital asset 500 may be a newly generated digital file that includes a composite image, video, or audio file, among others, that incorporates viewer reactions from one or more viewers that are group-watching the streaming media. In another aspect, the digital asset may be the viewer-generated content as captured directly from the viewer's client device.

In step 660, the digital asset 500 is transmitted to the client devices 160 for display to the viewers. In one aspect, the digital asset 500 may be displayed to only those viewers that have provided viewer-generated content for the asset. In another aspect, the digital asset may be displayed to all viewers that are group-watching the streaming media.

In yet another aspect, each viewer may be polled at step 670 to obtain their approval of the captured viewer-generated content before generation of the digital asset 500. In another aspect, each viewer may be polled after viewing the digital asset 500. Alternatively, rather than polling the viewer's directly, the digital asset creation module 330 may reference stored preferences for respective viewers before generating the digital asset 500.

At step 680, the digital asset 500 is published for display, storage, or further editing by the viewers at the client devices 160. After publishing the final digital asset to the client devices, the viewers may use or share the digital asset with others (e.g. through use on social media platforms).

The foregoing detailed description of the technology herein has been presented for purposes of illustration and description. It is not intended to be exhaustive or to limit the technology to the precise form disclosed. Many modifications and variations are possible in light of the above teaching. The described aspects were chosen in order to best explain the principles of the technology and its practical application to thereby enable others skilled in the art to best utilize the technology in various aspects and with various modifications as are suited to the particular use contemplated. It is intended that the scope of the technology be defined by the claim.

What is claimed is:

1. A method for creating digital assets from one or more viewers of streaming media, the method comprising:
   storing data regarding the streaming media;
   receiving viewer-generated content captured by a tracking device during display of the streaming media, wherein the viewer-generated content comprises an image or video of a reaction from the one or more viewers during the display of the streaming media;
   storing the viewer-generated content in association with the streaming media;
   generating a preliminary digital asset from the viewer-generated content, wherein the preliminary digital asset comprises the stored image or video;
   providing a display of the preliminary digital asset including the stored image or video of the reaction to the one or more viewers for feedback prior to publication;
   polling the one or more viewers for the feedback regarding the preliminary digital asset;
   automatically modifying the preliminary digital asset based on a predicted approval level for at least one of the one or more viewers; and
   publishing the modified digital asset.

2. The method of claim 1, further comprising providing the streaming media to a viewer client device of the one or more viewers.

3. The method of claim 1, wherein the viewer reaction further comprises at least one of: audio, text recorded, or input at a viewer client device displaying the streaming media.

4. The method of claim 1, wherein the viewer reaction is captured in real-time.

5. The method of claim 1, further comprising associating the viewer-generated content with the streaming media by:
   identifying a timestamp associated with the display of the streaming media;
   assigning the timestamp to the corresponding reaction within the viewer-generated content; and
   storing data regarding the timestamp of the streaming media and the assigned timestamp for the viewer-generated content.

6. The method of claim 1, further comprising generating a viewer overlay during the display of the streaming media based on the viewer-generated content, wherein the viewer overlay displays the stored image or video of the reaction from the one or more viewers in real-time during the display of the streaming media.

7. The method of claim 6 wherein the viewer overlay is a multi-panel display corresponding to a number of the viewers.

8. A host server system for creating digital assets from one or more viewers of streaming media, the system comprising:
   a communication interface that communicates over a communication network, wherein the communication interface receives viewer-generated content captured by a tracking device during display of the streaming media, wherein the viewer-generated content comprises an image or video of a reaction from the one or more viewers during the display of the streaming media;
   a database in memory that stores the viewer-generated content in association with the streaming media; and
   a processor that executes instructions stored in memory, wherein the processor executes the instructions to:
      generate a preliminary digital asset from the viewer-generated content, wherein the preliminary digital asset comprises the stored image or video of the reaction;
      provide a display of the preliminary digital asset including the stored image or video of the reaction to the one or more viewers for feedback prior to publication;
      poll the one or more viewers for the feedback regarding the preliminary digital asset;
      automatically modify the preliminary digital asset based on a predicted approval level for at least one of the one or more viewers; and
      publish the modified digital asset.

9. The system of claim 8, further comprising providing the streaming media to a viewer client device of the one or more viewers through a host server interface.

10. The system of claim 8, wherein the viewer reaction further comprises at least one of: audio, or text recorded or input at a viewer client device displaying the streaming media.

11. The system of claim 8, wherein the viewer reaction is captured in real-time.

12. The system of claim 8, wherein the processor executes further instructions to associate the viewer-generated content with the streaming media by:
   identifying a timestamp associated with the display of the streaming media;
   assigning the timestamp to the corresponding reaction within the viewer-generated content; and
   storing data regarding the timestamp of the streaming media and the assigned timestamp for the viewer-generated content.

13. The system of claim 8, wherein the processor executes further instructions to generate a viewer overlay during display of the streaming media based on the viewer-generated content, wherein the viewer overlay displays the stored image or video of the reaction from the one or more viewers in real-time during the display of the streaming media.

14. The system of claim 13, wherein the viewer overlay is a multi-panel display corresponding to a number of the viewers.

15. A non-transitory computer-readable storage medium having embodied thereon a program, the program being executable by a processor to perform a method for creating digital assets from one or more viewer of streaming media, the method comprising:
  storing data regarding the streaming media;
  receiving viewer-generated content captured by a tracking device during display of the streaming media, wherein the viewer-generated content comprises an image or video of a reaction from the one or more viewers during the display of the streaming media;
  storing the viewer-generated content in association with the streaming media;
  generating a preliminary digital asset from the viewer-generated content, wherein the preliminary digital asset comprises the stored image or video of the reaction;
  providing a display of the preliminary digital asset including the stored image or video of the reaction to the one or more viewers for feedback prior to publication;
  polling the one or more viewers for the feedback regarding the preliminary digital asset;
  automatically modifying the preliminary digital asset based on a predicted approval level for at least one of the one or more viewers; and
  publishing the modified digital asset.

16. The non-transitory computer-readable storage medium of claim 15, further comprises instructions executable to provide the streaming media to a viewer client device of the one or more viewers.

17. The non-transitory computer-readable storage medium of claim 15, further comprising instructions executable to associate the viewer-generated content with the streaming media by:
  identifying a timestamp associated with the display of the streaming media;
  assigning the timestamp to the corresponding reaction within the viewer-generated content; and
  storing data regarding the timestamp of the streaming media and the assigned timestamp for the viewer-generated content.

18. The non-transitory computer-readable storage medium of claim 15, further comprising instructions executable to generate a viewer overlay during display of the streaming media based on the viewer-generated content, wherein the viewer overlay displays the stored image or video of the reaction from the one or more viewers in real-time during the display of the streaming media.

19. The method of claim 1, wherein the viewer-generated content includes images or video of a plurality of the viewers associated with different individual streams of the streaming media, and wherein generating the preliminary digital asset includes generating a composite of the images or video of the plurality of the viewers.

20. The method of claim 1, further comprising predicting that a stored image or video in the preliminary digital asset should be rejected based on image analysis and machine learning, and modifying the preliminary digital asset based on the prediction.

* * * * *